(12) United States Patent
Johnson

(10) Patent No.: US 8,067,108 B1
(45) Date of Patent: Nov. 29, 2011

(54) HYBRID BATTERY FOR USE OVER EXTENDED TEMPERATURE RANGE

(75) Inventor: Arden P. Johnson, Arlington, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 912 days.

(21) Appl. No.: 12/030,895

(22) Filed: Feb. 14, 2008

Related U.S. Application Data

(60) Provisional application No. 60/889,783, filed on Feb. 14, 2007.

(51) Int. Cl.
  *H01M 10/44* (2006.01)
  *H01M 4/36* (2006.01)
  *H01M 4/48* (2006.01)
  *H01M 4/82* (2006.01)
  *H01M 6/00* (2006.01)

(52) U.S. Cl. .......................... 429/50; 429/105; 29/623.1

(58) Field of Classification Search ............... 429/9, 27, 429/48, 50, 101, 105, 149, 196, 210, 337, 429/498, 535
  See application file for complete search history.

(56) References Cited

U.S. PATENT DOCUMENTS

| | | | |
|---|---|---|---|
| 3,542,602 A | 11/1970 | Jean-Paul Gabano | |
| 3,926,669 A | 12/1975 | Auborn | |
| 4,246,327 A | 1/1981 | Skarstad et al. | |
| 4,277,545 A * | 7/1981 | Kalnoki-Kis | 429/48 |
| 4,318,969 A | 3/1982 | Peled et al. | |
| 4,367,266 A | 1/1983 | Kalnoki-Kis | |
| 4,400,453 A * | 8/1983 | Blomgren et al. | 429/325 |
| 4,416,957 A | 11/1983 | Goebel et al. | |
| 4,418,129 A | 11/1983 | Goebel | |
| 4,461,815 A * | 7/1984 | Peled et al. | 429/105 |
| 4,465,743 A | 8/1984 | Skaratad et al. | |
| 4,547,441 A | 10/1985 | Vallin et al. | |
| 4,560,632 A | 12/1985 | Alberto | |
| 4,563,401 A | 1/1986 | Kane et al. | |
| 4,664,989 A | 5/1987 | Johnson | |
| 5,182,177 A | 1/1993 | Schlaikjer | |
| 5,209,994 A | 5/1993 | Blattenberger et al. | |
| 5,358,803 A | 10/1994 | Abraham et al. | |
| 5,998,052 A * | 12/1999 | Yamin | 429/9 |
| 6,045,941 A | 4/2000 | Milewits | |
| 6,187,479 B1 | 2/2001 | Liu | |
| 6,410,181 B1 * | 6/2002 | Spillman et al. | 429/101 |
| 7,157,171 B2 * | 1/2007 | Huang | 429/406 |
| 2004/0224195 A1 * | 11/2004 | Huang | 429/17 |
| 2004/0248009 A1 | 12/2004 | De Jonghe et al. | |

OTHER PUBLICATIONS

McKay et al., New Lithium Oxyhalide Reserve Battery Technology, 2000, IEEE, pp. 283-286. http://ieeexplore.ieee.org/stamp/stamp.jsp?tp=&arnumber=838417.* Curtis F. Holmes, Lithium/Halogen Batteries. US.
C.C. Liang and C.F. Holmes, The Lithium/Iodine Pacemaker Battery, Progress in Batteries & Solar Cells, vol. 2., 1979. US.

* cited by examiner

*Primary Examiner* — Barbara Gilliam
*Assistant Examiner* — Jennifer Rea
(74) *Attorney, Agent, or Firm* — Michael F. Scalise

(57) ABSTRACT

A hybrid battery comprising at least two nonaqueous electrochemical systems is described. The first cell comprises an anode of an alkaline earth metal or alloy thereof, and the second cell comprises an anode of an alkali metal or alloy thereof. The first cell is preferably an alkaline earth metal/oxyhalide cell, more preferably a calcium/oxyhalide cell or cells. The second cell is preferably an alkali metal alloy/oxyhalide cell, more preferably a lithium alloy/oxyhalide cell or cells. Such a cell combination is particularly useful for power a down-hole well tool. The down-hole tool is powered by the first cell during a surface test and as the tool descends into the well until all of the calcium is discharged. Then, the second cell powers the down-hole tool for the remainder of the down-hole procedure.

31 Claims, 1 Drawing Sheet

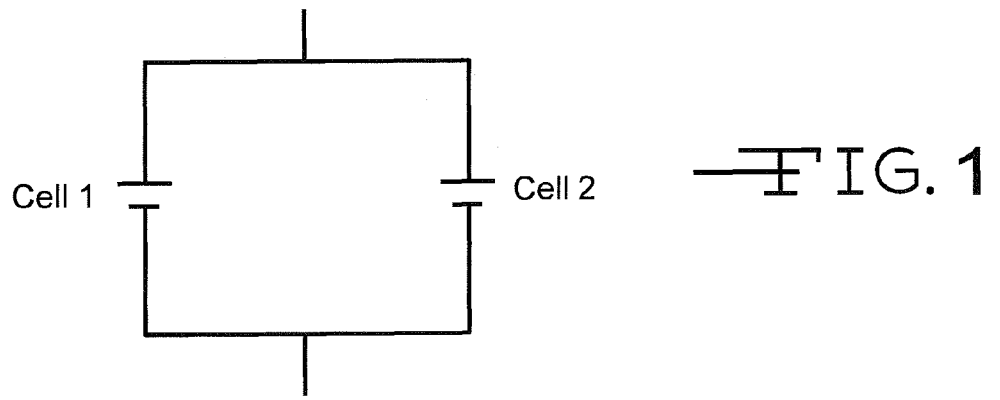
FIG. 1
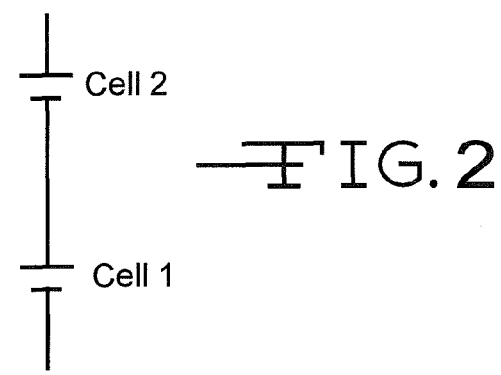
FIG. 2
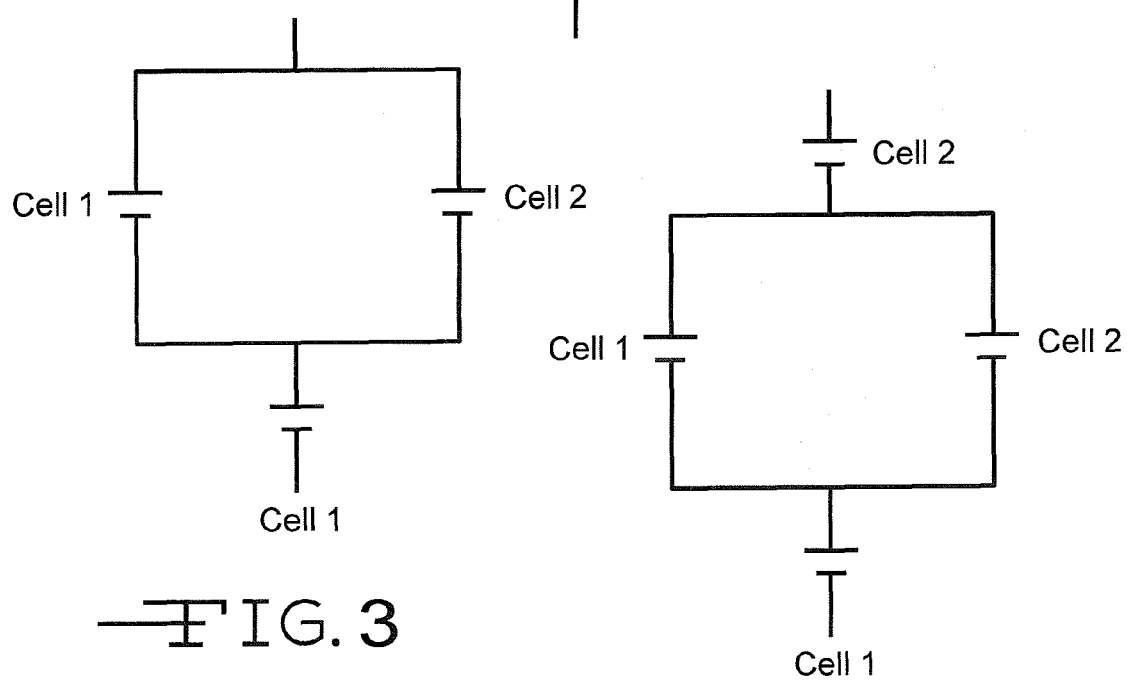
FIG. 3
FIG. 4

HYBRID BATTERY FOR USE OVER EXTENDED TEMPERATURE RANGE

CROSS-REFERENCE TO RELATED APPLICATION

This application claims priority from U.S. Provisional Application Ser. No. 60/889,783, filed Feb. 14, 2007.

BACKGROUND OF THE INVENTION

1. Field of the Invention

The present invention relates to the conversion of chemical energy to electrical energy. More particularly, this invention relates to a power source that is particularly useful at elevated temperatures such as those found in well drilling operations as well as at very low temperatures down to −40° C., and lower.

In certain applications such as oil exploration, batteries are required that can operate at temperatures up to 200° C. and even higher. Batteries that are commonly used in such high temperature applications are based on oxyhalide chemistries, such as lithium/thionyl chloride cells or lithium/sulfuryl chloride cells. These cells are highly advantageous for high temperature use because the oxyhalide liquid cathode materials are stable at elevated temperatures. Furthermore, when pure lithium metal is used as the anode material, oxyhalide cells are useful at very low temperatures, down to −40° C., and lower, as well as at relatively high temperatures.

Regardless of the cathode chemistry, at about 180° C. lithium-based cells become extremely hazardous. Lithium metal melts at about 180° C. and can react violently with liquid catholytes or liquid electrolytes in solid cathode cell systems. The operating temperature of lithium can be extended upward somewhat through the use of certain alloys, for example, aluminum or magnesium. Since these lithium alloys have higher melting temperatures than pure lithium, cells having them as an anode material can be used at temperatures up to about 200° C., and higher. The drawback is that lithium alloys operate poorly at lower temperatures. Lithium alloy cells that can run safely at temperatures above 180° C. typically cannot deliver useful performance below about 70° C. This is a serious problem in most oil exploration applications where it is highly advantageous to test downhole tools and their battery power sources at the surface under ambient conditions to confirm they will function properly when down-hole.

Accordingly, what is needed is a battery system that is functional at both ambient temperatures (25° C. or lower) and at temperature up to about 200° C. and higher. Such a battery system does not currently exist.

2. Prior Art

U.S. Pat. No. 4,461,815 to Peled et al. describes using calcium as the anode material in an oxyhalide cell. Calcium is a very attractive choice for use in an oxyhalide liquid cathode cell in some regards. First, it gives very high cell potentials close to what is obtained with lithium, and secondly, it has a much higher melting point than lithium. This means that calcium-containing cells are useful above 180° C. without becoming hazardous. However, calcium reacts with oxyhalide liquid cathode materials during cell discharged, thereby undergoing a self-discharge reaction that consumes active materials. This self-discharge reaction severely limits discharge efficiency, leading to low discharge capacity. Because of this severe limitation, calcium/oxyhalide cells have never come into practical use.

SUMMARY OF THE INVENTION

In accordance with the present invention, there is provided a hybrid battery comprising at least two nonaqueous electrochemical systems. The first comprises an anode of an alkaline earth metal or alloy thereof, and the second comprises an anode of an alkali metal or alloy thereof. The first cell is preferably an alkaline earth metal/oxyhalide cell, more preferably a calcium/oxyhalide cell or cells (for example, at least one calcium/thionyl chloride cell). The second cell is preferably an alkali metal alloy/oxyhalide cell, more preferably a lithium alloy/oxyhalide cell or cells (for example, at least one lithium-magnesium alloy/thionyl chloride cell). The first and second cells comprise a cathode collector, and a liquid cathode-electrolyte, the cathode-electrolyte comprising a solute dissolved in an active reducible electrolyte solvent such as at least one oxyhalide of a Group V or Group VI element of the Periodic Table and/or a liquid halide of a group IV, V or VI element of the Periodic Table, with or without a cosolvent. The active reducible electrolyte solvent performs the dual function of acting as solvent for the electrolyte salt and as an active cathode (depolarizer) of the cell. The term "cathode-electrolyte" is used herein to describe electrolytes containing solvents that can perform this dual function.

The hybrid battery is operable over a broad temperature range, from below ambient up to about 200° C. and higher, without risk of any hazardous behavior. The reason for this is because the first alkaline earth metal/oxyhalide cell or cells provide the majority of power at the lower end of the temperature range, i.e., at about ambient, while the second alkali metal alloy/oxyhalide cell or cells provide the majority of power at the higher end of the temperature range above about 70° C. The two different types of cells can be used in parallel or in series, or in a combination of both arrangements.

These and other aspects of the present invention will become increasingly more apparent to those skilled in the art by reference to the following detailed description and the appended drawings.

BRIEF DESCRIPTION OF THE DRAWINGS

FIGS. 1 to 4 are electrical schematics of various configurations for the first and second cells of the hybrid battery of the present invention.

DETAILED DESCRIPTION OF THE PREFERRED EMBODIMENTS

The present invention relates to a hybrid battery as a combination of two or more high energy density oxyhalide cells. Each cell comprises an active metal anode, a cathode collector, and an ionically conductive cathode-electrolyte solution comprising a solute dissolved in an active liquid cathode (depolarizer) with or without a reactive or non-reactive co-solvent. The active metal anode of the first cell is different than that of the second cell.

Useful anode materials in oxyhalide cells are generally consumable metals. In the present invention, the first oxyhalide cell includes alkaline earth metals and alloys of alkaline earth metals while the second oxyhalide cell includes alkali metals and alkali metal alloys. The term "alloy" as used herein and in the appended claims is intended to include mixtures, solid solutions such as lithium magnesium, and intermetallic compounds such as lithium monoaluminide. The preferred alkaline earth metal for the anode of the first cell is calcium while lithium, sodium and potassium are the preferred anode materials for the second oxyhalide cell, lithium being the most preferred. The anode material for the second cell is selected from Group IA of the Periodic Table of Elements, including lithium, sodium, potassium, etc., and their alloys and intermetallic compounds including, for example Li—Mg, Li—Al, Li—Si, Li—B and Li—Si—B alloys and intermetallic compounds. The preferred anode comprises lithium, and the more preferred anode comprises a lithium alloy, the preferred lithium alloy being lithium-magnesium with the magnesium comprising from between about 0.5% to about 50% by weight of the alloy. The greater the amounts of magnesium present by weight in the alloy, however, the lower the energy density of the second cell.

The form of the anode may vary, but preferably the anode is a thin metal sheet or foil of the anode metal, pressed or rolled on a metallic anode current collector, i.e., preferably comprising titanium, titanium alloy, stainless steel or nickel, to form an anode component. Copper, tungsten and tantalum are also suitable materials for the anode current collector. In the first and second oxyhalide cells of the present invention, the anode component has an extended tab or lead of the same material as the anode current collector, i.e., preferably nickel, stainless steel or titanium, contacted by a weld to a cell case of conductive metal in a case-negative electrical configuration. Alternatively, the anode may be formed in some other geometry, such as a bobbin shape, cylinder or pellet to allow an alternate low surface cell design.

As used herein and as described in an article titled "Electrochemical Reactions In Batteries" by Akiya Kozawa and R. A. Powers in the Journal of Chemical Education—Vol. 49, pages 587 to 591, September 1972 edition, a cathode-electrolyte depolarizer or catholyte is the cathode reactant and, therefore, the material that is electrochemically reduced at the cathode. The cathode collector is not an active reducible material. Instead, it functions as a current collector plus electronic conductor to the positive (cathode) terminal of the cell. In other words, the cathode collector is a situs for the electrochemical reduction reaction of the active cathode material and the electronic conductor to the cathode terminal of the cell.

For both the first and second oxyhalide cells, the active liquid reducible cathode-electrolyte depolarizer can either be mixed with a conductive solute, which is a non-reactive material but is added to improve conductivity of the liquid active reducible cathode materials, or it can be mixed with both a conductive solute and a reactive or non-reactive co-solvent material. A reactant co-solvent is one that is electrochemically active and functions as an active cathode material. A non-reactive co-solvent is one that is electrochemically inactive and cannot function as an active cathode material.

For either or both of the preferred first calcium/oxyhalide cell and the second lithium alloy/oxyhalide cell comprising the hybrid battery, the solute may be a simple or double salt that produces an ionically conductive solution when dissolved in the solvent. Preferred solutes are complexes of inorganic or organic Lewis acids and inorganic ionizable salts. The main requirements for utility are that the salts whether simple or complex, are compatible with the solvent being employed and yield a solution which is ionically conductive. According to the Lewis or electronic concept of acids and bases, many substances which do not contain active hydrogen can act as acids or acceptors of electron doublets. The basic concept is set forth in the chemical literature (Journal of the Franklin Institute, Vol. 266—July/December, 1938, pages 293-313 by G. N. Lewis).

A suggested reaction mechanism for the manner in which these solute complexes function in a solvent is described in detail in U.S. Pat. No. 3,542,602 to Gabano, which is incorporated herein by reference. In this patent, it is suggested that the complex or double salt formed between the Lewis acid and the ionizable salt yields an entity which is more stable than either of the components alone. Typical Lewis acids suitable for use in the first and second oxyhalide cells of the present invention include aluminum fluoride, aluminum bromide, aluminum chloride, gallium chloride, gallium bromide, antimony pentachloride, zirconium tetrachloride, phosphorus pentachloride, boron fluoride, boron chloride, and boron bromide. Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

The double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride. Another such double salt is that formed by the combination of gallium chloride and lithium chloride to yield lithium gallium tetrachloride.

Suitable oxyhalides for use in the first and second cells of the present invention include sulfuryl chloride, thionyl chloride, phosphorus oxychloride, thionyl bromide, chromyl chloride, vanadyl tribromide and selenium oxychloride, or mixtures of two or more of them.

Useful organic co-solvents include the following classes of compounds:

Trialkyl borates: e.g., trimethyl borate, $(CH_3O)_3B$ (liquid range −29.3° C. to 67° C.);

Tetraalkyl silicates: e.g., tetramethyl silicate, $(CH_3O)_4Si$ (boiling point 121° C.);

Nitroalkanes: e.g., nitromethane, $CH_3NO_2$ (liquid range −17° C. to 100.8° C.);

Alkylnitriles: e.g., acetonitrile, $CH_3CN$ (liquid range −45° C. to 81.6° C.);

Dialkylamides: e.g., dimethylformamide, $HCON(CH_3)_2$ (liquid range −60.48° C. to 149° C.);

Lactams: e.g., N-methylpyrrolidone,

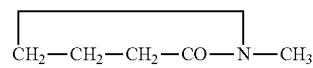

(liquid range −16° C. to 202° C.);

Tetraalkylureas: e.g., tetramethylurea, $(CH_3)_2N$—CO—N$(CH_3)_2$ (liquid range −1.2° C. to 166° C.);

Monocarboxylic acid esters: e.g., ethyl acetate (liquid range −83.6° C. to 77.06° C.);

Orthoesters: e.g., trimethylorthoformate, $HC(OCH_3)_3$ (boiling point 103° C.);

Lactones: e.g., α-(gamma)butyrolacetone,

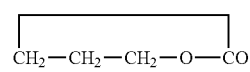

liquid range −42° C. to 206° C.);

Dialkyl carbonates: e.g., dimethyl carbonate, $OC(OCH_3)_2$ (liquid range 2° C. to 90° C.);

Alkylene carbonates: e.g., propylene carbonate,

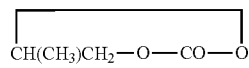

(liquid range −48° C. to 242° C.);

Monoethers: e.g., diethyl ether (liquid range −116° C. to 34.5° C.);

Polyethers: e.g., 1,1- and 1,2-dimethoxyethane (liquid ranges −113.2° C. to 64.5° C. and −58° C. to 83° C., respectively);

Cyclic ethers: e.g., tetrahydrofuran (liquid range −65° C. to 67° C.); 1,3-dioxolane (liquid range −95° C. to 78° C.);

Nitroaromatics: e.g., nitrobenzene (liquid range 5.7° C. to 210.8° C.);

Aromatic carboxylic acid halides: e.g., benzoyl chloride (liquid range 0° C. to 197° C.); benzoyl bromide (liquid range −24° C. to 218° C.);

Aromatic sulfonic acid halides: e.g., benzene sulfonyl chloride (liquid range 14.5° C. to 251° C.);

Aromatic phosphonic acid dihalides: e.g., benzene phosphonyl dichloride (boiling point 258° C.);

Aromatic thiophosphonic acid dihalides: e.g., benzene thiophosphonyl dichloride (boiling point 124° C. at 5 mm);

Cyclic sulfones: e.g., sulfolane,

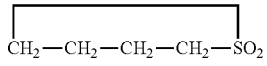

(melting point 22° C.); 3-methylsulfolane (melting point −1° C.);

Alkyl sulfonic acid halides: e.g., methanesulfonyl chloride (boiling point 161° C.);

Alkyl carboxylic acid halides: e.g., acetyl chloride (liquid range −112° C. to 50.9° C.); acetyl bromide (liquid range −96° C. to 76° C.); propionyl chloride (liquid range −94° C. to 80° C.);

Saturated heterocyclics: e.g., tetrahydrothiophene (liquid range −96° C. to 121° C.); 3-methyl-2-oxazolidone (melting point 15.9° C.);

Dialkyl sulfamic acid halides: e.g., dimethyl sulfamyl chloride (boiling point 80° C., 16 mm.);

Alkyl halosulfonates: e.g., ethyl chlorosulfonate (boiling point 151° C.);

Unsaturated heterocyclic carboxylic acid halides: e.g., 2-furoyl chloride (liquid range −2° C. to 173° C.);

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° C. to 31.36° C.);

Esters and/or halides of dibasic carboxylic acids: e.g., ethyl oxalyl chloride (boiling point 135° C.);

Mixed alkyl sulfonic acid halides and carboxylic acid halides: e.g., chlorosulfonyl acetyl chloride (boiling point 98° C. at 10 mm.);

Dialkyl sulfoxides: e.g., dimethyl sulfoxide (liquid range 18.4° C. to 189° C.);

Dialkyl sulfates: e.g., dimethylsulfate (liquid range −31.75° C. to 188.5° C.);

Dialkyl sulfites: e.g., dimethylsulfite (boiling point 126° C.);

Alkylene sulfites: e.g., ethylene glycol sulfite (liquid range −11° C. to 173° C.); and Halogenated alkanes: e.g., methylene chloride (liquid range −95° C. to 40° C.); 1,3-dichloropropane (liquid range −99.5° C. to 120.4° C.)

Of the above, the preferred co-solvents are nitrobenzene; tetrahydrofuran; 1,3-dioxolane; 3-methyl-2-oxazolidone; propylene carbonate; α-butyrolactone; sulfolane; ethylene glycol sulfite; dimethyl sulfite and benzoyl chloride. Of the preferred co-solvents, the best are nitrobenzene; 3-methyl-2-oxazolidone; benzoyl chloride; dimethyl sulfite and ethylene glycol sulfite because they are more chemically inert to battery components and have long liquid ranges, and especially because they permit highly efficient utilization of the cathode materials.

It is also within this invention to employ inorganic solvents such as liquid inorganic halides of elements from Groups IV, V and VI of the Periodic Table, e.g., selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$), tin tribromide chloride ($SnBr_3Cl$), sulfur monochloride ($S_2Cl_2$), and sulfur dichloride ($SCl_2$). These halides, in addition to functioning as an electrolyte solvent in nonaqueous cells, can also function as a cathode-electrolyte thereby contributing to the overall active reducible material in the cells.

In selecting the particular oxyhalide for both the first and the second cells in accordance with the present invention, it is important to consider the stability of the particular oxyhalide in the presence of the other cell components and operating temperatures at which the cell is expected to perform. Thus an oxyhalide should be selected that will be stable in the presence of the other cell components.

In addition, if it is desired to render the cathode-electrolyte solution more viscous or convert it into a gel, a gelling agent such as colloidal silica may be added.

Any compatible solid that is substantially electronically conductive is useful as a cathode collector in the cells of the present hybrid battery. It is desirable to have as much surface contact as possible between the cathode-electrolyte and the collector. It is, therefore, preferred to employ a porous collector that provides a high surface area interface with the liquid cathode-electrolyte. The collector may be metallic and may be present in any physical form, such as a metallic film, screen or a pressed powder. Preferably, however, a pressed powder collector is made at least partially of carbonaceous or other high surface area material contacted to a conductive substrate. Suitable conductive substrates are selected from the group consisting of nickel, stainless steel, titanium, tantalum, platinum, gold, aluminum, cobalt-nickel alloys, nickel-containing alloys, highly alloyed ferritic stainless steel containing molybdenum and chromium, and nickel-, chromium- and molybdenum-containing alloys. Cathode collectors prepared as described above may be in the form of one or more plates operatively associated with at least one or more plates of anode material, or in the form of a strip wound with a corresponding strip of anode material in a structure similar to a "jellyroll".

A separator, if employed in the first calcium/oxyhalide cell and the second lithium alloy/oxyhalide cell of the present hybrid battery, must be chemically inert and insoluble in the oxyhalide liquid cathode materials and have a porosity that permits the liquid catholytes to permeate through and contact the anodes of the respective cells, thus establishing an ion transfer path between the anode and cathode. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.). A preferred separator is a non-woven or woven glass fiber mat.

The preferred form of both the first calcium/oxyhalide cell and the second lithium alloy/oxyhalide electrochemical cells is a case-negative design wherein the anode is in contact with a conductive metal casing and the cathode current collector is the positive terminal. The cathode current collector is in contact with a positive terminal pin via a lead of the same material as the current collector. The lead is welded to both the current collector and the positive terminal pin for electrical contact.

A preferred material for the casing is stainless steel although titanium, mild steel, nickel-plated mild steel and aluminum are also suitable. The casing header comprises a metallic lid having an opening to accommodate the glass-to-metal seal/terminal pin feedthrough for the cathode. The anode is preferably connected to the case or the lid. An additional opening is provided for filling the liquid cathode (depolarizer) into the casing. The casing header comprises elements having compatibility with the other components of the electrochemical cells and is resistant to corrosion. After filling with the respective depolarizers, the cells are hermetically sealed such as by close-welding a stainless steel plug over the fill hole, but not limited thereto. The first and second cells of the present invention can also be constructed in a case-positive design.

The relatively high rate of self-discharge that has prevented practical use of alkaline earth metal/oxyhalide cells, and preferably, calcium/oxyhalide cells in the past is actually an advantage in the present invention. In a down-hole tool application, the first calcium/oxyhalide cell is capable of problem-free operation while the tool is tested at the surface and as it warms up to high temperature operating conditions as the tool descends into the well. The first calcium/oxyhalide cell continues to discharge until all of the calcium has been consumed. By that time, the alkali metal alloy/oxyhalide cell, and preferably, the lithium alloy/oxyhalide cell has warmed up to a temperature at which it is operable. During discharge and after the calcium is fully consumed, the calcium/oxyhalide cell remains completely non-hazardous. This means that the calcium/oxyhalide cell has no harmful effect on the operation of the down-hole tool.

FIGS. 1 to 4 show schematic representations of cell systems of the present hybrid battery. In FIGS. 1 and 2, the first and second cells are electrically connected in a parallel and a series arrangement, respectively. FIG. 3 shows a first cell electrically connected to a configuration of an additional first cell and a second cell connected in parallel. FIG. 4 is a modification of FIG. 3 with an additional second cell connected after the schematic arrangement shown in FIG. 3.

It should be understood that the above schematics represent just some of a myriad of electrical of possible configurations for the hybrid battery of the present invention. Those skilled in the art will be able to readily envision others without departing from the scope of the present invention as defined by the appended claims.

What is claimed is:

1. A battery, which comprises:
   a) a first nonaqueous electrochemical cell comprising a first anode active metal, a first cathode collector, and an ionically conductive cathode-electrolyte solution comprising a solute dissolved in an active liquid cathode;
   b) a second nonaqueous electrochemical cell comprising a second anode active metal different than the first anode active metal, a second cathode collector, and an ionically conductive cathode-electrolyte solution comprising a solute dissolved in an active liquid cathode; and
   c) wherein the cathode-electrolyte for the first and second cells contains at least one liquid oxyhalide selected from the group consisting of sulfuryl chloride, thionyl chloride, phosphorus oxychloride, thionyl bromide, chromyl chloride, vanadyl tribromide and selenium oxychloride, and
   d) wherein the first and second cells are electrically connected to each other.

2. The battery of claim 1 wherein the first and second cells are electrically connected to each other in series.

3. The battery of claim 1 wherein the first and second cells are electrically connected to each other in parallel.

4. The battery of claim 1 wherein the first anode active metal is an alkaline earth metal.

5. The battery of claim 1 wherein the first anode active metal is calcium.

6. The battery of claim 1 wherein the second anode active metal is selected from the group consisting of lithium, sodium, and potassium.

7. The battery of claim 1 wherein the second anode active metal is a lithium alloy selected from the group consisting of Li—Mg, Li—Al, Li—Si, Li—B, and Li—Si—B alloys.

8. The battery of claim 1 wherein the second anode active metal is a lithium-magnesium alloy with the magnesium comprising from about 0.5% to about 50% by weight of the alloy.

9. The battery of claim 1 wherein the cathode-electrolyte for at least one of the first and second cells contains a solute as a complex of a Lewis acid and an ionizable alkali metal salt.

10. The battery of claim 1 wherein the cathode-electrolyte for at least one of the first and second cells contains either an inorganic cosolvent or an organic cosolvent.

11. The battery of claim 1 wherein the cathode-electrolyte for at least one of the first and second cells contains at least one co-solvent selected from the group consisting of trimethyl borate, tetramethyl silicate, nitromethane, acetonitrile, dimethylformamide, N-methylpyrrolidone, tetramethylurea, ethyl acetate, trimethylorthoformate, α-(gamma)butyrolacetone, dimethyl carbonate, propylene carbonate, diethyl ether, 1,1-dimethoxyethane, 1,2-dimethoxyethane, tetrahydrofuran, 1,3-dioxolane, nitrobenzene, benzoyl chloride, benzoyl bromide, benzene sulfonyl chloride, benzene phosphonyl dichloride, benzene thiophosphonyl dichloride, sulfolane, 3-methylsulfolane, methanesulfonyl chloride, acetyl chloride, acetyl bromide, propionyl chloride, tetrahydrothiophene, 3-methyl-2-oxazolidone, dimethyl sulfamyl chloride, ethyl chlorosulfonate, 2-furoyl chloride, 3,5-dimethylisoxazole, 1-methylpyrrole, 2,4-dimethylthiazole, furan, ethyl oxalyl chloride, chlorosulfonyl acetyl chloride, dimethyl sulfoxide, dimethylsulfate, dimethylsulfite, ethylene glycol sulfite, methylene chloride, and 1,3-dichloropropane.

12. The battery of claim 1 wherein the cathode-electrolyte for at least one of the first and second cells contains at least one inorganic solvent selected from the group consisting of selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride, tin tribromide chloride, sulfur monochloride, and sulfur dichloride.

13. The battery of claim 1 wherein the first cell is a calcium/thionyl chloride cell.

14. The battery of claim 1 wherein the second cell is a lithium-magnesium alloy/thionyl chloride cell.

15. A method for providing a battery, comprising the steps of:
   a) providing a first nonaqueous electrochemical cell comprising a first anode active metal, a first cathode collector, and an ionically conductive cathode-electrolyte solution comprising a solute dissolved in an active liquid cathode;
   b) providing a second nonaqueous electrochemical cell comprising a second anode active metal different than the first anode active metal, a second cathode collector, and an ionically conductive cathode-electrolyte solution comprising a solute dissolved in an active liquid cathode; and
   c) wherein the cathode-electrolyte for the first and second cells contains at least one liquid oxyhalide selected from the group consisting of sulfuryl chloride, thionyl chloride, phosphorus oxychloride, thionyl bromide, chromyl chloride, vanadyl tribromide and selenium oxychloride, and
   d) electrically connecting the first cell to the second cell other.

16. The method of claim 15 including electrically connecting the first cell to the second cell either in series or in parallel.

17. The method of claim 15 including providing the first anode active metal as calcium.

18. The method of claim 15 including providing the second anode active metal as a lithium alloy selected from the group consisting of Li—Mg, Li—Al, Li—Si, Li—B, and Li—Si—B alloys.

19. The method of claim 15 including providing the cathode-electrolyte for at least one of the first and second cells containing at least one co-solvent selected from the group consisting of trimethyl borate, tetramethyl silicate, nitromethane, acetonitrile, dimethylformamide, N-methylpyrrolidone, tetramethylurea, ethyl acetate, trimethylorthoformate, α-(gamma)butyrolacetone, dimethyl carbonate, propylene carbonate, diethyl ether, 1,1-dimethoxyethane, 1,2-dimethoxyethane, tetrahydrofuran, 1,3-dioxolane, nitrobenzene, benzoyl chloride, benzoyl bromide, benzene sulfonyl chloride, benzene phosphonyl dichloride, benzene thiophosphonyl dichloride, sulfolane, 3-methylsulfolane, methanesulfonyl chloride, acetyl chloride, acetyl bromide, propionyl chloride, tetrahydrothiophene, 3-methyl-2-oxazolidone, dimethyl sulfamyl chloride, ethyl chlorosulfonate, 2-furoyl chloride, 3,5-dimethylisoxazole, 1-methylpyrrole, 2,4-dimethylthiazole, furan, ethyl oxalyl chloride, chlorosulfonyl acetyl chloride, dimethyl sulfoxide, dimethylsulfate, dimethylsulfite, ethylene glycol sulfite, methylene chloride, and 1,3-dichloropropane.

20. The method of claim 15 including providing the first cell as a calcium/thionyl chloride couple and the second cell as a lithium-magnesium alloy/thionyl chloride couple.

21. The battery of claim 9 wherein the Lewis acid is selected from the group consisting of aluminum fluoride, aluminum bromide, aluminum chloride, gallium chloride, gallium bromide, antimony pentachloride, zirconium tetrachloride, phosphorus pentachloride, boron fluoride, boron chloride, and boron bromide.

22. The battery of claim 9 wherein the ionizable alkali metal salt is selected from the group consisting of lithium fluoride, lithium chloride, lithium bromide, lithium sulfide, sodium fluoride, sodium chloride, sodium bromide, potassium fluoride, potassium chloride and potassium bromide.

23. The method of claim 15 including providing the cathode-electrolyte for at least one of the first and second cells contains a solute as a complex of a Lewis acid and an ionizable alkali metal salt.

24. The method of claim 23 including selecting the ionizable alkali metal salt from the group consisting of lithium fluoride, lithium chloride, lithium bromide, lithium sulfide, sodium fluoride, sodium chloride, sodium bromide, potassium fluoride, potassium chloride and potassium bromide.

25. A battery, which comprises:
   a) a first nonaqueous electrochemical cell comprising calcium as a first anode active metal, a first cathode collector, and an ionically conductive cathode-electrolyte solution comprising a solute dissolved in a first active liquid cathode;
   b) a second nonaqueous electrochemical cell comprising a lithium-containing second anode active metal, a second cathode collector, and an ionically conductive cathode-electrolyte solution comprising a solute dissolved in a second active liquid oxyhalide; and
   c) wherein the cathode-electrolyte for at least one of the first and second cells contains a solute as a complex of a Lewis acid and an ionizable alkali metal salt, and
   d) wherein the first and second cells are electrically connected to each other.

26. The battery of claim 25 wherein the second anode active metal is a lithium alloy selected from the group consisting of Li—Mg, Li—Al, Li—Si, Li—B, and Li—Si—B alloys.

27. The battery of claim 25 wherein the second anode active metal is a lithium-magnesium alloy with the magnesium comprising from about 0.5% to about 50% by weight of the alloy.

28. The battery of claim 25 wherein the first and second liquid oxyhalides for the first and second cells are selected from the group consisting of sulfuryl chloride, thionyl chloride, phosphorus oxychloride, thionyl bromide, chromyl chloride, vanadyl tribromide and selenium oxychloride.

29. The battery of claim 25 wherein the first and second cells are electrically connected to each other in series or in parallel.

30. A battery, which comprises:
   a) a first nonaqueous calcium/thionyl chloride electrochemical cell;
   b) a second nonaqueous lithium magnesium/thionyl chloride electrochemical cell; and
   c) wherein the first and second cells are electrically connected to each other.

31. The battery of claim 30 wherein the cathode-electrolyte for at least one of the first and second cells contains a solute as a complex of a Lewis acid and an ionizable alkali metal salt.

* * * * *